United States Patent Office 2,985,431
Patented May 23, 1961

2,985,431
WINCH APPARATUS FOR USE IN NUCLEAR REACTORS

Donald Mason Sutherland, Urmston, Harold Proctor, Heaton Moor, Stockport, John Kenneth Jobbins, Sale, and Edwin Arthur White, Culcheth, near Warrington, England, assignors to Metropolitan-Vickers Electrical Co. Ltd., and United Kingdom Atomic Energy Authority, London, England Filed May 20, 1957, Ser. No. 660,370

Claims priority, application Great Britain May 18, 1956

1 Claim. (Cl. 254—168)

This invention relates to winch apparatus for use in nuclear reactors.

In the movement of winch cables (or similar flexible ties) inside a nuclear reactor operating under heat generating conditions lubrication becomes a problem owing first, to the temperature at which the cable has to operate, second to the desire to dispense with or minimize lubrication of moving parts which may contaminate the reactor and third, to the difficulty of carrying out running maintenance. Additional problems arise due to confined operating spaces or a requirement for remote indication of movement of the winch cables.

The present invention, which is directed mainly to the up and down operation of control and shut-off rods by mechanisms confined to a limited size of access tube penetrating a pressure vessel, seeks to provide a relaxation of the severity of the above problems. It also provides a winch apparatus which is well suited for use in conjunction with an eddy current brake device to limit the speed of "free" fall of a control rod in emergency conditions.

The winch apparatus of the invention comprises a winding drum adapted to accommodate a flexible cable in the form of a flat spiral, a guide pulley for the cable in passage to and from the winding drum, roller means loading the cable against said guide pulley and means for converting the linear movement of the cable into a linearly related angular movement to provide for remote measurement of the movement of the cable.

The invention will be more readily understood if reference is made to the accompanying drawings which illustrate by way of example one embodiment of the invention for moving a control rod in a nuclear reactor. In the drawings.

Figure 1:
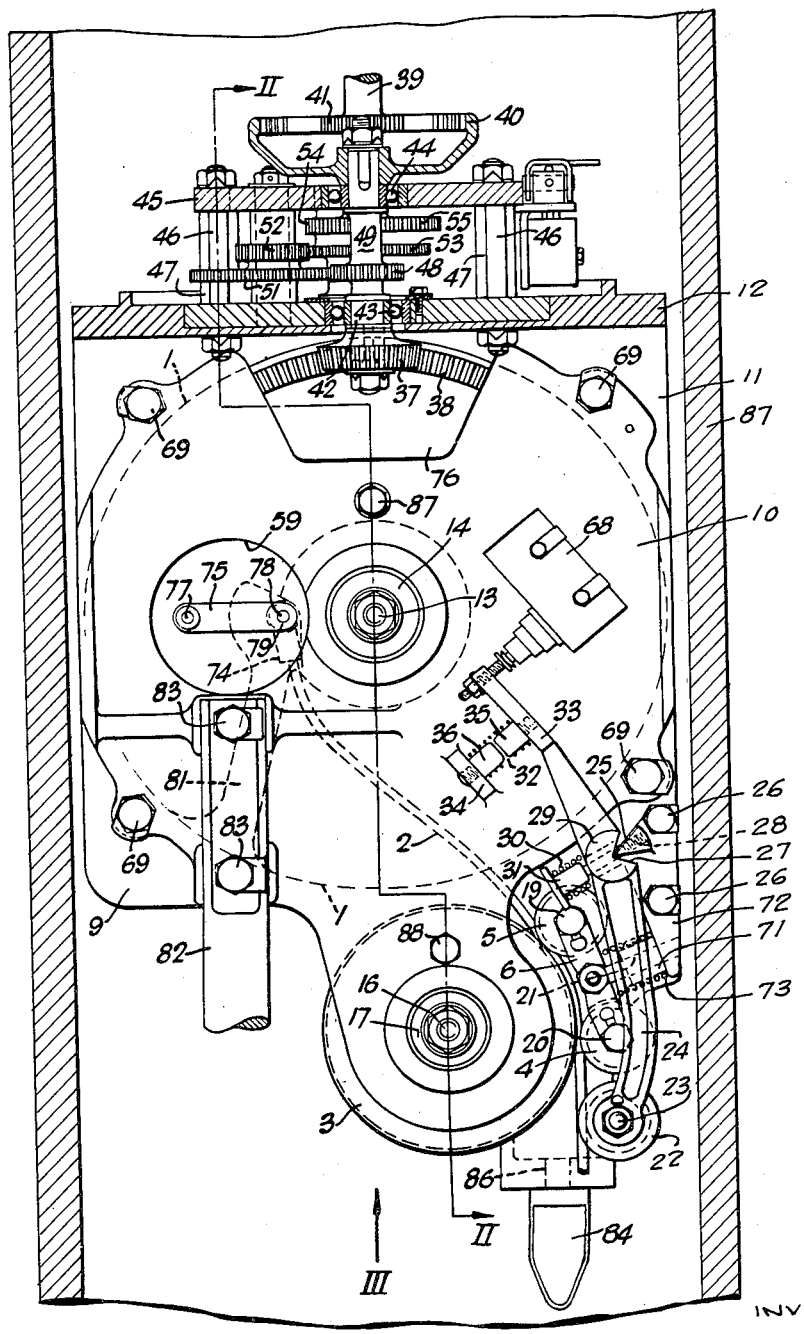
Fig. 1 is an elevation (part in section).
Figure 2:
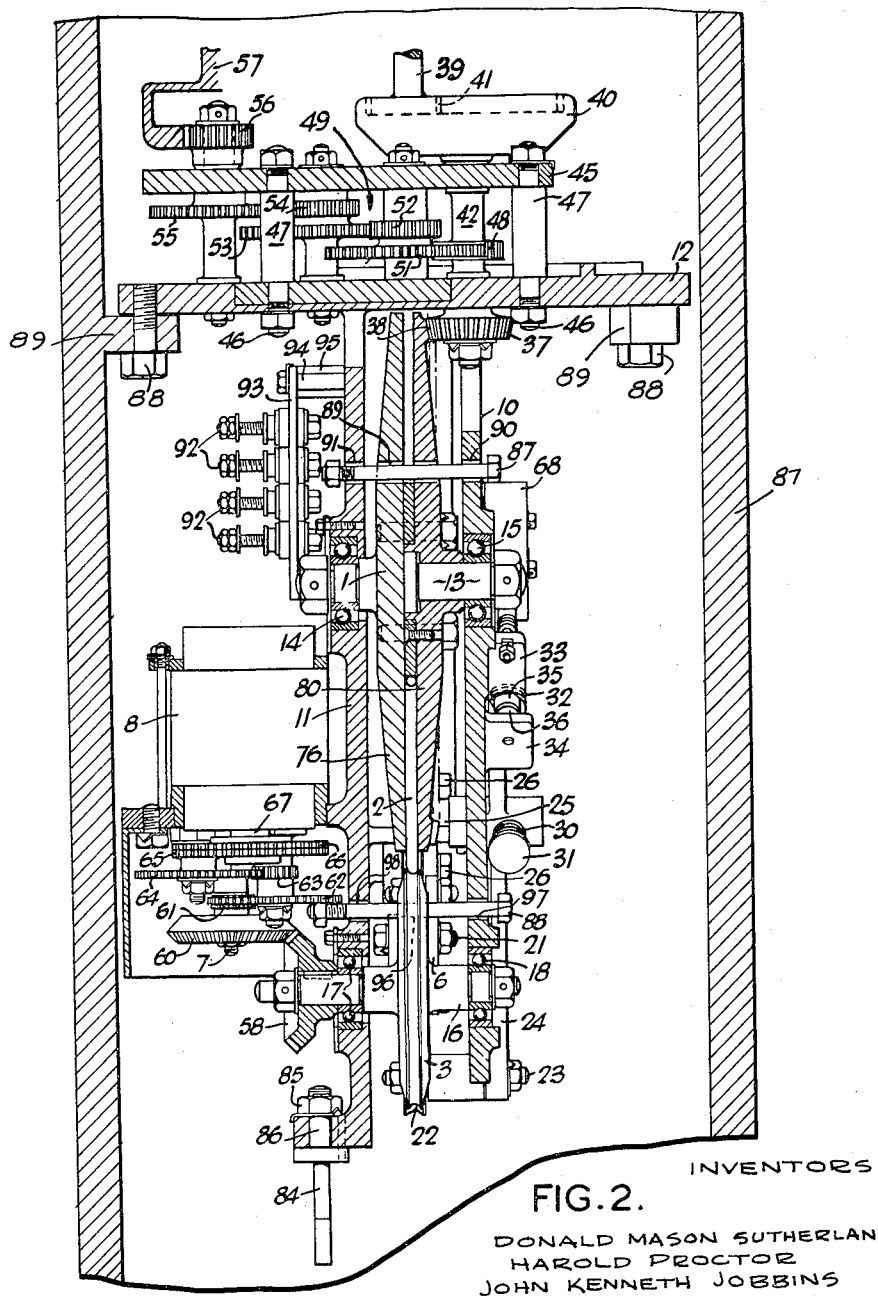
Fig. 2 is a sectional elevation along II—II of Fig. 1.
Figure 3:
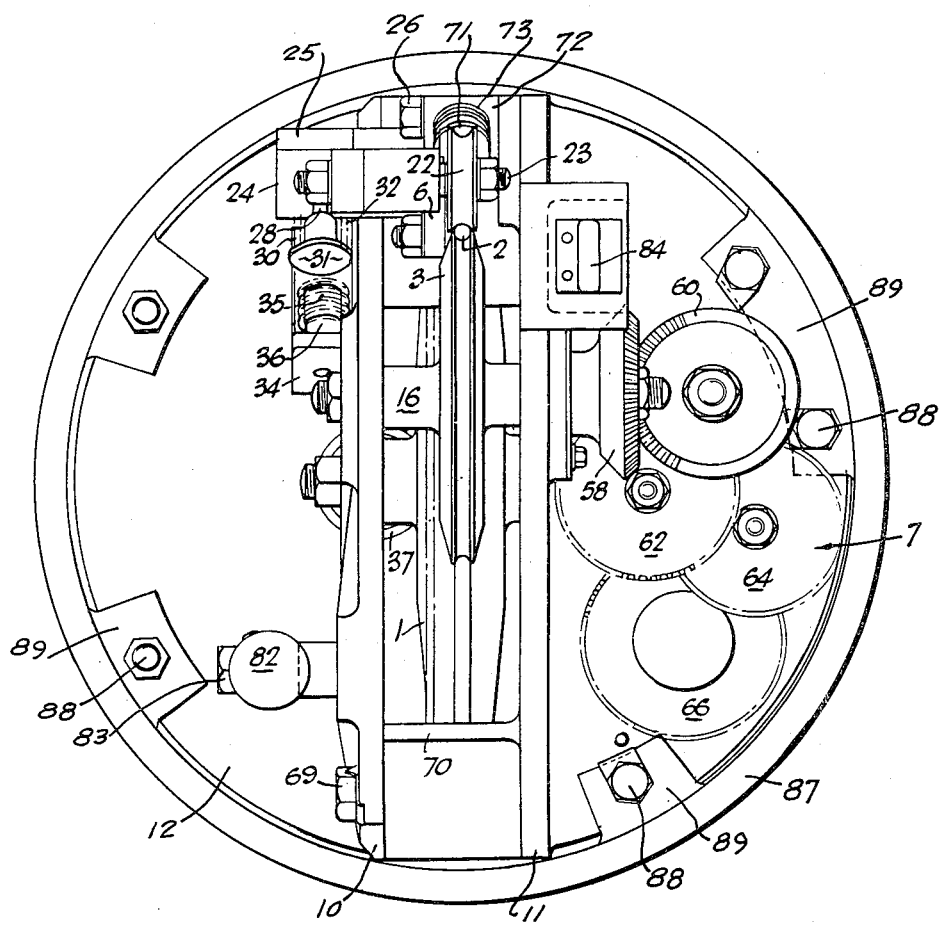
Fig. 3 is a plan in the direction of the arrow III in Fig. 1.

In the drawings a plate like winding drum 1 carries a cable 2 wound in the form of a flat spiral. The cable 2 passes from the drum 1 over a coplanar guide pulley 3 and passes on to a control rod attached to the free end of the cable 2. The cable 2 is loaded against the guide pulley 3 by a pair of jockey pulleys 4, 5 mounted on a spring loaded arm 6. The guide pulley 3 is connected by a gear train 7 to drive a "Magslip" or electrical rotational position transmitter 8, which is adapted to give an indication of the revolutions of the guide pulley and hence the position of the load on the free end of the cable 2, the movement of the load being linearly related to the angular movement of the pulley 3.

Considering the drawings in more detail a main framework 9 comprises two parallel plate members 10 and 11. The plate member 11 depends from a transverse supporting plate member 12 and is integral therewith. The plate member 10 is attached to the plate member 11 by bolts 69. The framework is contained within an access tube 87 which penetrates a pressure vessel (not shown) containing a pressurized gas cooled nuclear reactor. The framework is fixed inside the access tube 87 at the transverse supporting plate member 12 by bolts 88 which screw into lugs 89 formed inside the access tube. Spacer plates 70 integral with the plate 10 provide for the correct location of the plate 10 with the plate 11. The drum 1 is mounted to rotate between the two parallel plates 10 and 11 of the main framework 9 by means of a stub shaft 13 mounted in ball journal bearings 14 and 15 in the plates 11 and 10 respectively. The pulley drum 1 is a shrunk fit on the stub shaft 13. The spacer plates 70 are curved and also act as a shroud around part of the outer edge of the winding drum to prevent the cable 2 leaving the drum 1. The guide pulley 3 is also rotatably mounted between the two plates 11 and 10 by means of a spindle 16 and ball journal bearings 17 and 18. The pair of jockey pulleys 4 and 5 are mounted at the ends 19 and 20 of the arm 6. The arm 6 is carried by a rod 21 which is slidable in a bush 71. The bush 71 is carried on a plate 72 mounted on plate 11 by bolts 26. A compression spring 73 acts between the arm 6 and the plate 72. The cable 2 is loaded at a point between the guide pulley 3 and the control rod it carries by a pulley 22 which is carried on a spindle 23 mounted on a rocker arm 24. The rocker arm 24 is pivoted on a knife edge, the knife edge 25 being also carried by the plate 72 bolted to the plate 11 of the main framework 9 by bolts 26. The rocker arm 24 has a V-grooved part 27 which rests on the knife edge 25 and is held thereon by a bolt 28 associated with the knife edge 25, the bolt 28 passes through a hole 29 in the part 27 of the rocker arm 24. The rocker arm 24 is loaded against the knife edge 25 by a compression spring 30 embracing the bolt 28 and held in compression by a finger nut 31 which screws on to the bolt 28. The loading of the pulley 22, which is carried on the rocker arm 24, is applied by means of a compression spring 32 which is held in compression between the part 33 of the rocker arm 24 and a lug 34 cast on the outside of the plate 10 of the main framework 9. Combined stop and spring location pegs 35 and 36 are provided on the part 33 and the lug 34 respectively.

The drum 1 is driven by a bevel gear 37 which engages with teeth 38 on the drum 1. A motor drive shaft 39 is connected to drive an internally toothed gear 40 by a spur gear 41 mounted on the drive shaft 39. The internal gear 40 is connected by a shaft 42 mounted in bearings 43 and 44, to drive the bevel gear 37 (and hence the pulley drum 1) directly. The bearings 44 and 43 are respectively mounted in the end plate 12 and in a plate 45 attached in parallel relationship to the end plate 12 by bolts 46 and spacers 47. The shaft 42 carries a spur gear 48 which provides a drive to an eddy current brake control device through a gear train 48 comprising spur gears 51, 52, 53, 54, 55, 56 and an internal gear 57, which is part of a rotor of an eddy current brake adapted to limit the speed of the shaft 39.

The spindle 16 of the guide pulley 3 carries a bevel gear 58 which drives the "Magslip" 8 through a gear train 7 comprising a bevel gear 60 spur gears 61, 62, 63, 64, 65 and 66, the spur gear 66 being attached to the shaft 67 of the "Magslip" 8. Electric terminals 92 for the "Magslip" 8 are mounted on a terminal board 93 which is mounted on the plate 11 by bolts 94 and spacers 95.

Attachment means between the cable 2 and the pulley drum 1 are provided. These attachment means comprise a ferrule 74 attached to the end of the cable 2, and a spring 75, mounted on the outside of one side plate 76 of the drum 1 by a rivet and washer 77, carries a pin 78. The pin 78 passes through a hole in the side plate 76 and extends through an eye 79 formed integral with the end of the ferrule 74, to the other side plate 80 of the drum 1. A channel 81 is cut in the inside face of the side plate 76 and extends from the point of entry of the pin 78 to the periphery of the plate 76. A hole 59 in the plate 10 provides access to the spring 75 when the drum 1 is situated correctly.

A locating spigot 82 is attached to the plate 10 by bolts 83 and a wedge shaped locating member 84 is mounted on the plate 11 by a nut 85 which screws on to a threaded part 86 of the member 84.

In use of the winch apparatus the cable 2 is wound or unwound from the pulley drum 1 to raise or lower a load by means of a drive motor and the connecting gears 41 and 37. The cable 2 passes over the guide pulley 3 and is loaded against it to prevent slipping by the jockey pulleys 4 and 5. The angular rotation of the guide pulley 3 is transmitted by the bevel gear 58 and gear train 7 to the "Magslip" 8. In the absence of slipping between cable 2 and pulley 3 the angular rotation of the guide pulley 3 is linearly related to the movement of the cable 2 and the "Magslip 8 gives a linear indication of the position of the control rod carried by the cable 2.

On relaxation of the tension in the cable, such as, when the control rod comes to rest at the bottom of its channel, the rocker arm 24 rotates in a clockwise sense under the loading of the compression spring 32, and operates a bottom limit switch 68 which serves to shut off the drum 1 driving motor.

In the detachment of the cable 2 from the drum 1 the drum is rotated (by hand driving the shaft 39) to bring a locking hole 89 into a position in line with locking holes 90, 91 in the plates 10, 11. The drum is then locked by fitted bolt or pin 87 inserted through the holes 90, 89, 91. The locking of the drum 1 brings the spring 75 etc. to a position where it is exposed in the hole 59. The spring is flexed to withdraw the pin 78 and then rotated about the rivet 77. The cable 2 is manipulated to introduce a degree of slack and to bring a locking hole 96 in the guide pulley 3 into position relative to locking holes 97, 98 in the plates 10 and 11. The guide pulley 3 is then locked by a fitted bolt or pin 88. The cable is then withdrawn along the channel 81 and cleared of the guide pulley 3 by raising the spring loaded arm 6, a reverse procedure is followed for attaching the cable 2 to the drum 1.

The overall ratio of the gear between the driving motor and the pulley drum 1 is 20:1 and that between the guide pulley 3 and the "Magslip" 8 is 22.66:1.

As the cable 2 is unwound from the drum 1 in a spiral manner, a gravitational fall of an object such as a control rod at the end of the cable 2 gives rise to a greater corresponding rotational acceleration of the drum 1. When the drum 1 is coupled to drive an eddy current brake the braking torque therefore tends to increase for each unit distance travelled by the object in its fall. This is very desirable in the case of a falling control rod acting as an emergency shut off as the rod has to be arrested at the end of its travel.

We claim:

A winch arrangement suitable for installation in an access tube penetrating a pressure vessel containing the moderator structure of a pressurized nuclear reactor, for storing cable to operate control rods in said moderator structure, comprising in combination a framework having a transverse supporting plate member for supporting the winch arrangement in the access tube, a second plate member depending from said transverse supporting plate member and having traverse dimensions no greater than those of said supporting plate member, a cable winding drum rotatable on said second plate member, driving means for said drum carried by said transverse supporting plate member, first pulley means for guiding cable in passage to and from said drum, said drum having a pair of parallel side flanges spaced part by the width of the cable and enabling said cable to be wound one turn upon another in the form of a one strand width flat spiral, second pulley means pressing said cable into close engagement with said first pulley means, transmitter means for remotely indicating the degree of rotation of said first pulley means, the overall transverse dimensions of said drum, said first and second pulley means and said transmitter means being no greater than the transverse dimension of said transverse supporting plate member.

References Cited in the file of this patent
UNITED STATES PATENTS

| | | |
|---|---|---|
| 934,104 | Steckel | Sept. 14, 1909 |
| 1,624,633 | Spoerri | Apr. 12, 1927 |
| 1,848,972 | Peebles | Mar. 8, 1932 |
| 2,121,870 | Greene | June 28, 1938 |
| 2,293,732 | Guttmann | Aug. 25, 1942 |
| 2,465,199 | Cohen | Mar. 22, 1949 |
| 2,668,036 | Klemm | Feb. 2, 1954 |
| 2,718,376 | Raney | Sept. 20, 1955 |